United States Patent [19]
Durham

[11] 3,824,834
[45] July 23, 1974

[54] CABLE BENDER
[76] Inventor: Henry B. Durham, 405 Chestnut St., Birmingham, Ala. 35206
[22] Filed: Mar. 5, 1973
[21] Appl. No.: 337,833

[52] U.S. Cl. .............................................. 72/387
[51] Int. Cl. ........................................ B21d 7/024
[58] Field of Search ............ 72/387, 388, 216, 309, 72/310, 319, 298; 140/123, 102.5

[56] References Cited
UNITED STATES PATENTS
| 347,488 | 8/1886 | Hunsicker | 72/298 |
| 530,203 | 12/1894 | Raymond | 72/298 |
| 674,574 | 5/1901 | Decrette | 72/298 |
| 1,903,436 | 4/1933 | Brown | 72/388 |
| 3,209,570 | 10/1965 | Hills | 72/387 |

FOREIGN PATENTS OR APPLICATIONS
| 444,016 | 7/1912 | France | 72/387 |

Primary Examiner—Charles W. Lanham
Assistant Examiner—Gene P. Crosby

[57] ABSTRACT

A cable bender comprising a pair of cable holding cradles pivotally connected together at adjacently positioned inner ends and wherein no restraint is applied to the cable in the region of the cable where it is bent. Wrench members are adapted to be connected to the cradles at opposite ends of the bender and bending is achieved by applying a torque and counter torque, respectively, to the cradles by the wrench members.

9 Claims, 1 Drawing Figure

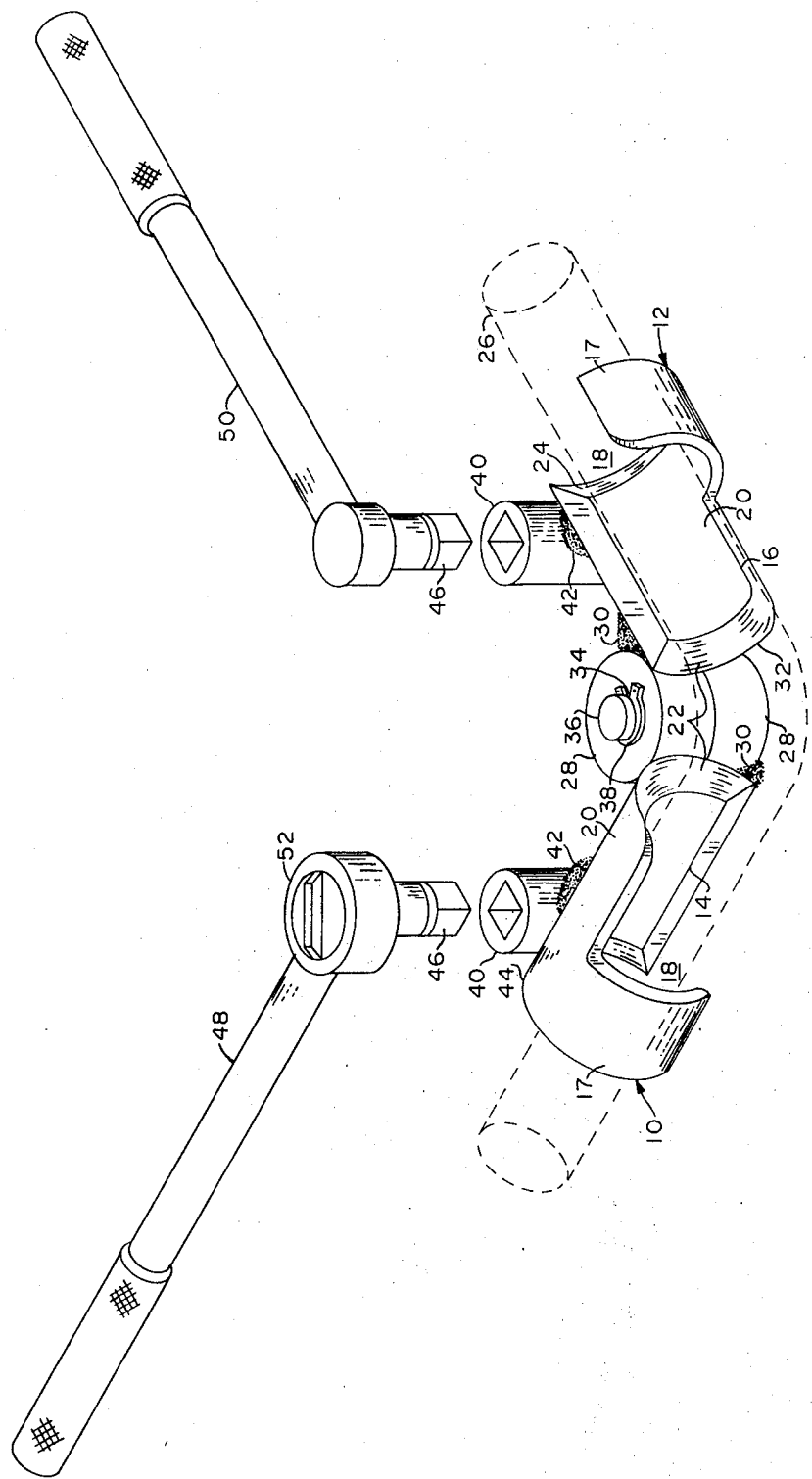

CABLE BENDER

BACKGROUND OF THE INVENTION

1. Field of the Invention

This invention relates to benders for bending tubular material and particularly to a bender adapted to bend electrical cable.

2. General Description of the Prior Art

The wiring of buildings, particularly those used for industrial and commercial purposes involves the use of quite large electrical cables. The installation of such cables requires considerable bending and forming and frequently this must be done within confined regions such as within switching and terminal housing and cable trays. Tools heretofore designed for the purpose of cable bending have generally not been adapted to bend cable within confined spaces and to make bends typically required for interconnection within such spaces. This has thus made it necessary to remove cable from an enclosure to form it making it more difficult to gauge the precise bends required and is time consuming. Further, in some instances such equipment encloses the cable, making removal of the equipment difficult after a bend. Still further, existing wire benders suffer the disadvantage that by virtue of their structural configurations, tremendous pressures are required to start a bend and thus one is generally unable to bend the very large cables.

SUMMARY OF THE INVENTION

Accordingly, is is an object of this invention to provide an improved cable bender which is small in form compared to previous cable benders and is thus particularly adapted for operation within confined regions.

It is the further object of this invention to provide a cable bender which is convenient to use and may be readily adjusted to comfortably apply adequate bending forces by an operator. In accordance with the invention a pair of identical, or substantially identical, cradles are constructed having a generally tubular interior surface. They are pivotally interconnected by coupling members at one end of each cradle and torque coupling members are attached at the opposite ends of the cradles at which there is also provided a finger which tubularly surrounds a cable on one side and on the top. One side is left open for removing a cable. The inner end portions of the cradles have no top regions, allowing the cable some freedom of upward movement and facilitating insertion and removal of a cable. These and other objects, features and advantages of the invention will become more apparent from the following description when considered together with the drawing.

BRIEF DESCRIPTION OF THE DRAWING

The single FIGURE of the drawing is a pictorial illustration of a preferred embodiment of the invention.

Referring to the drawing, the cable bender shown therein comprises a pair of coupled identical bending shoes 10 and 12. Each of the bending shoes includes a wire holding cradle, cradles 14 and 16, and each has a generally tubular interior which is configured to include a cable gripping finger 17 at its outer end, leaving a slot 18 of sufficient size to insert a cable to be formed. The remaining side portions of each cradle are generally open to facilitate removal of a cable after it is bent. A portion 20 of each side is enclosed to prevent edge engagement and furnish some side support for correctly positioning a cable. End interior surfaces 22 and 24 of each cradle are rounded and polished so as to protect the insulation of a cradle 26 being bent.

Each of the bending shoes is adapted to be attached to the other by means of a collar 28 attached to, as by weld 30, or made an integral part of the inner end 32 of each cradle. Collars 28 each have a central opening 34 and are pivotally coupled together by circular pin 36 which is axially supported by locking rings 38, one on each side. The axis of said pin is the coupling axis between bending shoes and is typically positioned within the range of 1 to 3 inches from the axis of a cable 26. A receptacle 40 is attached by weld 42 to the underside of outer end 44 of each of cradles 14 and 16 and each is adapted to accept the square shank 46 of a socket wrench, socket wrenches 48 and 50 as shown. Each of receptacle 40 can be engaged by a wrench from either end and the receptacles are symetrically positioned with a longitudinal axis parallel to the axis of pin 36, the pivotal axis of the bender. One of wrenches 48 and 50, wrench 48, is equipped with a ratchet 52 to facilitate comfortable bending positions by an operator.

To operate the bender, bending shoe 12 is first positioned about the cable by tilting the opposite shoe 10 upward sufficiently so that gripping finger 17 of shoe 12 can be looped under the cable which is then inserted through slot 18.

Once shoe 12 is symetrically positioned about the desired bend point, that is opposite the axis of pin 36, the other shoe 10 is rotated about pin 36 to a position of alignment with the cable and then is installed over it through slot 18.

In order to effect the desired bend, socket wrenches 48 and 50, are inserted into receptacles 40 of bending shoes 10 and 12, being positioned at a comfortable gripping angle.

The required bending force is then applied in an obvious manner through socket handles 48 and 50 to cause clockwise rotation of bending shoe 10 and counter-clockwise rotation of the opposite shoe 12 about pivot pin 36.

In this manner cable gripping fingers 17 apply equal and opposite bending forces to cable 26 which is supported by cradles 14 and 16 which by virtue of rounded edges 22 enable a graduated application of force to the cable.

Gripping fingers 17 on one side of one end of each bending shoe apply a bending force, and an inner surface of cradles 14 and 16 of the opposite shoe applies a counter force to the cable.

When the desired bend angle has been completed, bending shoe 10 is lifted and gripping finger 17 of the opposite shoe 12 is unhooked from cable 26 in the reverse manner to which it was installed.

What is claimed is:

1. A cable bender comprising:
   first and second cradles, each having a bottom tubular shaped interior and a tubular surface extending upward and forming a top interior surface at one end;
   coupling means extending from and under the opposite end of each said cradle for rotably interconnecting said cradles whereby said cradles may be relatively rotated about a common axis adjacent said opposite ends of each said cradle; and torque means extending from said one end of each said cradle and including means for applying a torque and counter torque to said cradles about an axis parallel to said common axis whereby a cable positioned in and held by said cradles is bent about said common axis.

2. A cable bender as set forth in claim 1 wherein the upper region of said opposite end of each of said cradles is open.

3. A cable bender as set forth in claim 2 wherein at least the interior edges of said opposite end region edges are tapered.

4. A cable bender as set forth in claim 3 wherein the axis of said coupling means is in the range of one to three inches from the axis of the tubular interior of said cradles.

5. A cable bender as set forth in claim 3 wherein the tubular surface in the end region of said opposite end of a said cradle extends upward to partially close one side of a said cradle.

6. A cable bender as set forth in claim 3 where each said torque means is engageable from either side of said cable bender.

7. A cable bender as set forth in claim 6 wherein at least one of said torque means comprises a receptacle extending from side to side, parallel to said common axis, and is adapted to be engaged by a removable handle.

8. A cable bender as set forth in claim 7 further comprising a said handle and wherein said handle includes ratchet means for applying a bending torque to the torque means of one of said cradles when a counter-torque is applied to the torque means of the other cradle.

9. A cable bender as set forth in claim 6 wherein said coupling means comprises a collar connected to each of said cradles and a pin extending through said collars and supporting said collars in side by side relationship.

* * * * *